Feb. 16, 1954  W. E. WRENN  2,669,680
MOTOR CONTROL SYSTEM FOR REGULATING SYSTEMS
Filed Nov. 7, 1951  4 Sheets-Sheet 1

Fig.1.

WITNESSES:

INVENTOR
William E. Wrenn.
BY
Ezra W. Savage
ATTORNEY

Feb. 16, 1954

W. E. WRENN

2,669,680

MOTOR CONTROL SYSTEM FOR REGULATING SYSTEMS

Filed Nov. 7, 1951

WITNESSES:

INVENTOR
William E. Wrenn.
BY
ATTORNEY

Patented Feb. 16, 1954

2,669,680

UNITED STATES PATENT OFFICE 2,669,680

MOTOR CONTROL SYSTEM FOR REGULATING SYSTEMS

William E. Wrenn, Sharon, Pa., assignor to Westinghouse Electric Corporation, East Pittsburgh, Pa., a corporation of Pennsylvania Application November 7, 1951, Serial No. 255,169

5 Claims. (Cl. 318—57)

1

This invention relates to electrical regulating systems, and in particular to regulating systems utilizing a plurality of step type regulators connected in parallel circuit relation for supplying a common load.

Where a plurality of tap changing regulating transformers are connected in parallel relation for supplying a common load, it is desirable that such regulators be kept in step in order that circulating current between the different tap changers will not cause excessive heating and reduce the output capacity of the regulating transformers. Different systems have been developed heretofore in attempts to keep the regulators in step but they have had different operating disadvantages.

One of the main difficulties has been in the braking of the tap changing motors to effect a positive braking and prevent an overrun of the parallel connected regulators associated with the motors with the result that such overruns often are of such an extent as to result in forcing the regulators to an out-of-step position. Where the units are thus forced out of step, all of the units are usually locked out with the result that the regulators cannot be further automatically operated until the operator has acted to bring them back into step.

Further where braking is provided for each unit it is sometimes found that in the event of failure of one of the brakes or of the operating relays associated with the control of one of the motors, that one unit may continue to operate when the other is stopped with the result that such one unit may be operated a number of steps out of parallel with respect to the other unit.

An object of this invention is to provide, in a regulating system utilizing a plurality of step type regulators connected for parallel operation, for maintaining the regulators in step during operation while providing effective braking to maintain the regulators in step upon completion of a regulating operation.

Another object of this invention is to provide, in a regulating system utilizing a plurality of motor driven step type regulators connected for parallel operation, for interconnecting the controls of the different regulators to provide simultaneous operation of the regulators to maintain them in step and interconnecting the braking controls for the motors to effectively brake each of the motors upon the completion of a predetermined regulating operation of the associated regulator.

A further object is to provide, in a regulating system utilizing a plurality of motor driven step type regulators connected for parallel operation and having a brake associated with each of the motors for operation after a regulating operation, an emergency brake for each of the motors having interconnected controls whereby the emergency brakes are operative to brake the motors if the normal brake fails to function upon completion of a regulating operation to thereby maintain the units not more than one step apart.

Other objects of this invention will become apparent from the following description when taken in conjunction with the accompanying drawings, in which:

Figures 1, 2, 3 and 4 form a composite drawing when

Figure 1:
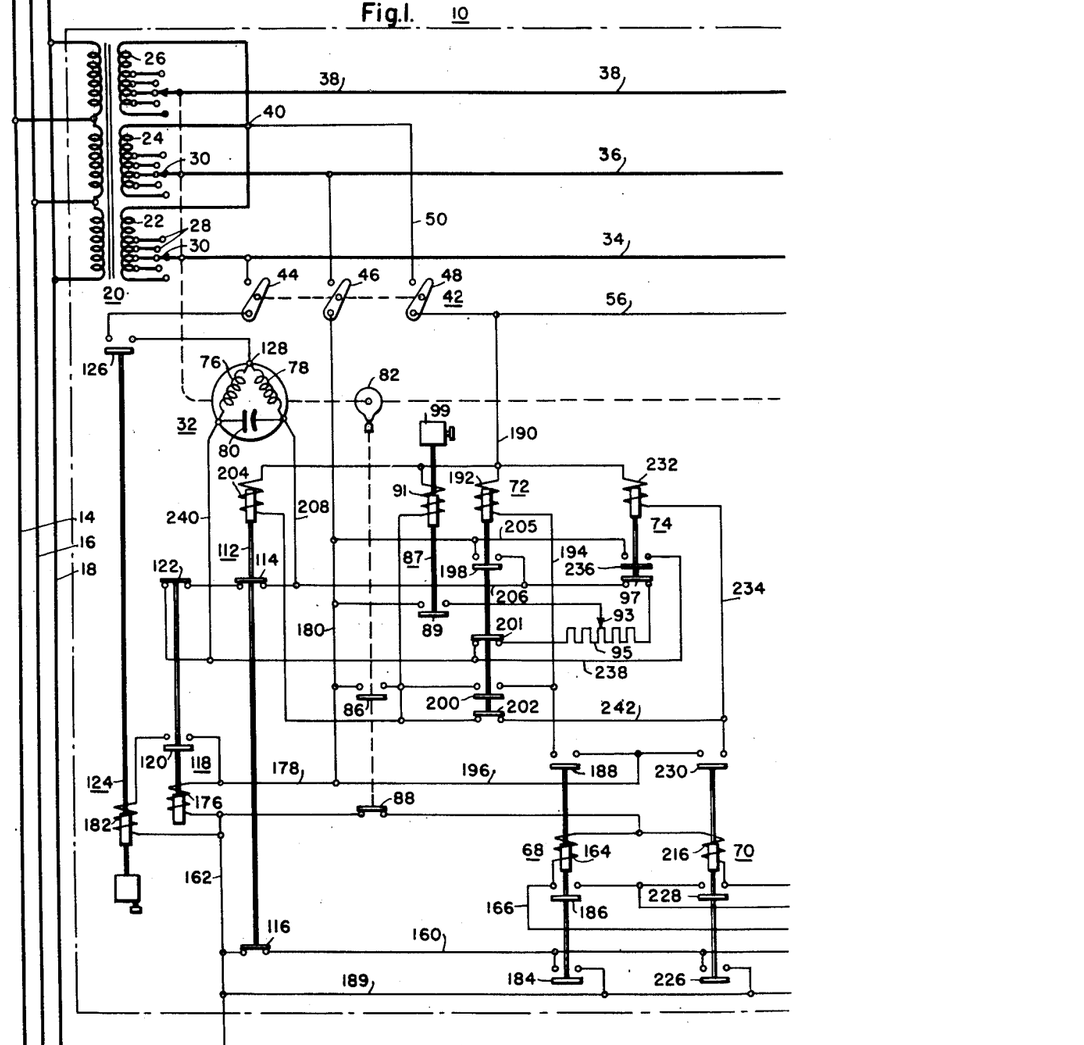
Figs. 1 and 2 are disposed side by side and Figs. 3 and 4 are disposed side by side with their upper edges butting the lower edges of Figs. 1 and 2, respectively, the composite drawing illustrating diagrammatically the circuits and apparatus embodying the teachings of this invention.
Figure 2:
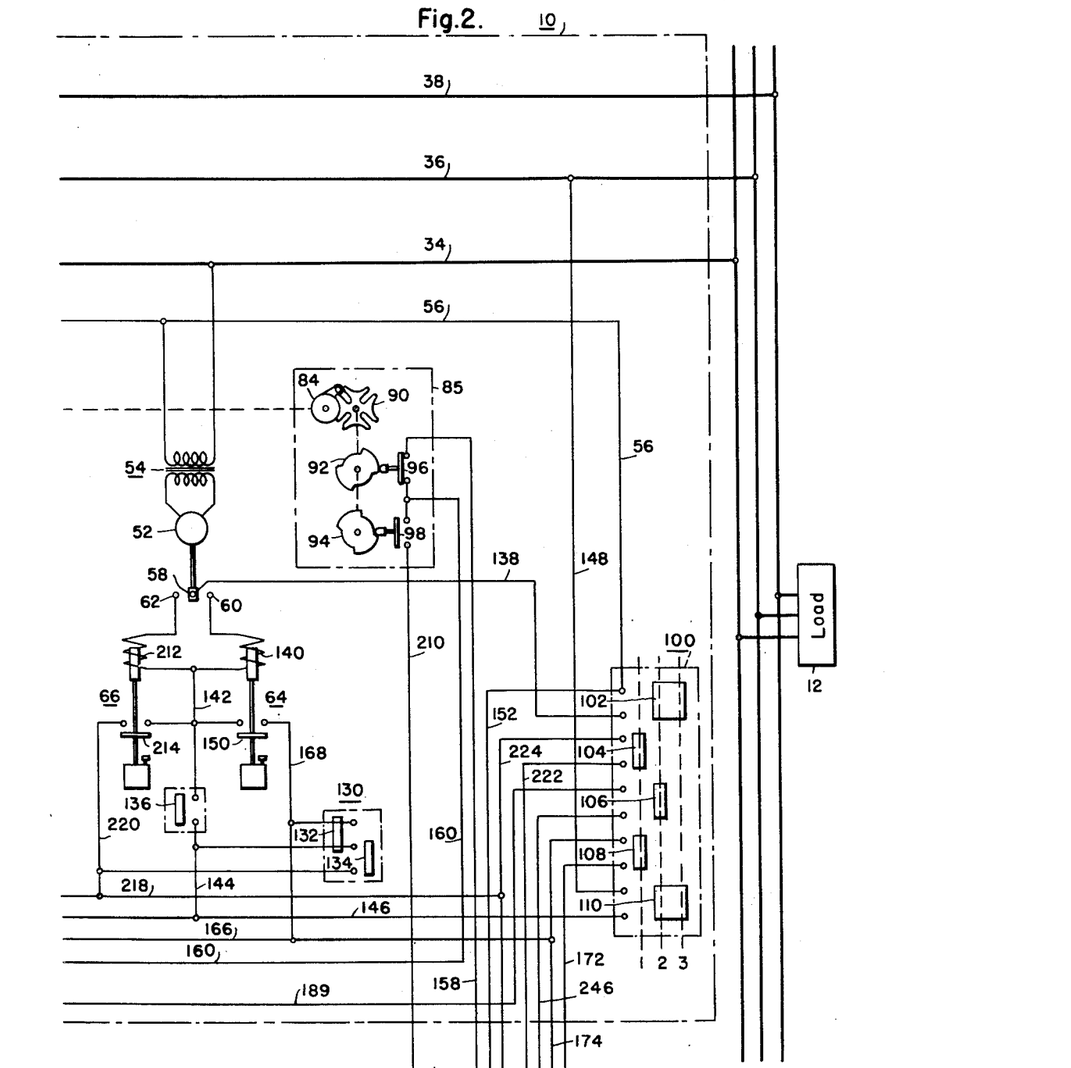
Figure 3:
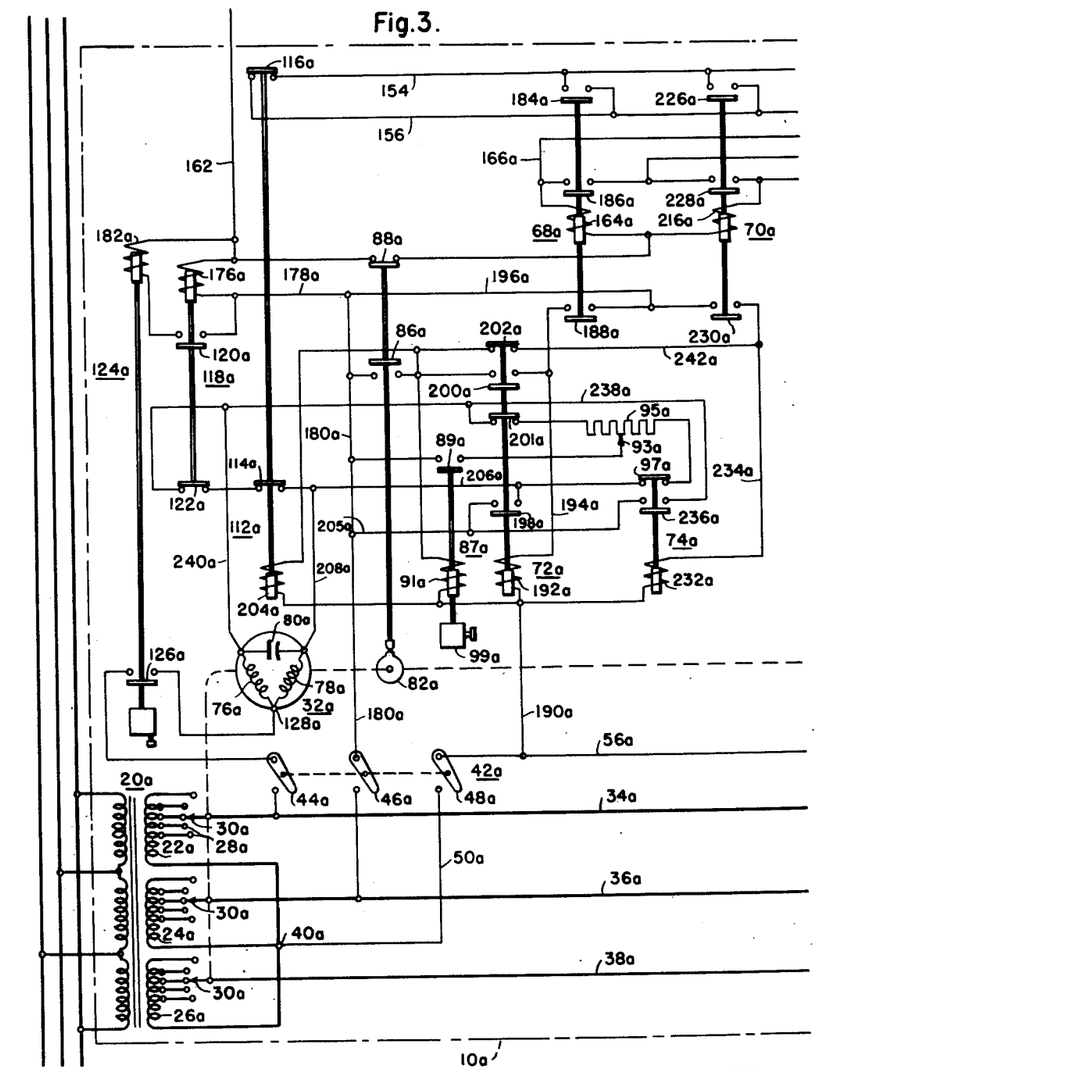
Figure 4:
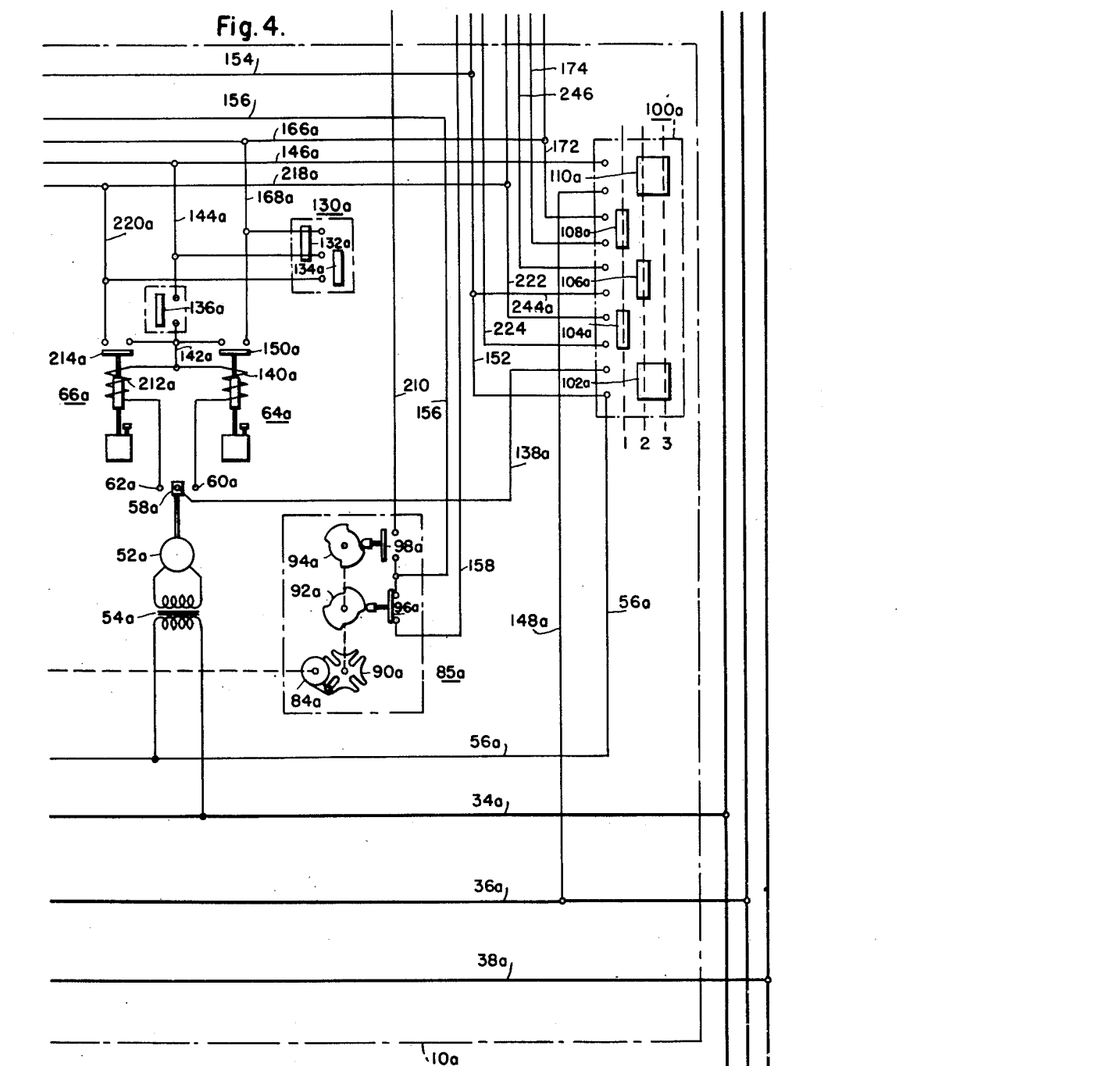

Referring to the composite drawing, there is represented two regulating units 10 and 10a, being illustrated in block form and connected in parallel circuit relation for supplying a common load 12 from a three-phase alternating-current power system represented by the conductors 14, 16 and 18. Each of the units 10 and 10a is substantially identical as to the components although the components of unit 10a are inverted for the purpose of simplifying the connections between the units in the drawing. For the purpose of simplifying the description of the components comprising the system illustrated, the components of unit 10 only will be described in detail, it being understood that like components of unit 10a will be similarly identified by the same number with the suffix "a" appended thereto.

Each of the units includes a tap changing regulating transformer or regulator 20 having the primary windings thereof connected to be supplied from the conductors 14, 16 and 18. The secondary windings 22, 24 and 26 of the tap changing transformer are each provided with a plurality of taps 28 disposed to be selectively engaged by a movable contact member 30 positioned in response to operation of a suitable motor operating mechanism represented by the motor 32. As illustrated, the secondary windings of the transformer 20 are connected by conductors 34, 36 and 38 to supply the load 12, the secondary windings being provided with a neutral point 40. The motor operating or control system for the motor 32 is disposed to be connected by a three-pole switch 42 having the switching members 44, 46 and 48 thereof for engaging fixed contact members to connect the control system to conductors 34, 36 and a neutral conductor 50 which is connected to the neutral point 40 of the secondary windings of the tap changing regulator.

In order to control the operation of the motor 32 in response to a deviation of the quantity which is to be regulated, a primary relay 52 is illustrated as being connected through a potential transformer 54 across the load conductor 34 and a neutral conductor 56 which is disposed to be connected by the switch 48 to the conductor 50, whereby the relay 52 will be energized to actuate its movable contact member 58 into engagement with contact members 60 or 62 depending upon the direction of the deviation. The primary relay 52 thus is disposed to initiate the control of the operation of the motor 32 in one or the other directions by energizing one or the other of the time delay relays 64 or 66 which, in turn, control secondary relays or contactors 68 or 70, respectively, the secondary relays being disposed to control the operation of motor controlling relays or contactors 72 and 74, respectively, as will be described more fully hereinafter.

The motor 32 is of the split-phase capacitor type having two substantially identical single-phase windings 76 and 78 with a phase-shifting capacitor 80 disposed to be connected in series circuit with one or the other of the windings 76 and 78 and thus disposed when energized to control the directional operation of the motor 32. As illustrated, the motor 32 is connected through a suitable gear drive (not shown) to operate the switch contact members 30 for simultaneously engaging the corresponding contact members 28 of the secondary windings 22, 24 and 26 and, simultaneously with a movement of the contact members 30, drive a pair of cam members 82 and 84 one revolution for each step of the movable contact members 30. The cam members 82 and 84 are disposed to control predetermined switching operations.

Thus the cam 82, when the switch contact members 30 engage corresponding contact members 28 of the secondary windings 22, 24 and 26, maintains a contact member 86 in a circuit interrupting position and a contact member 88 in a circuit closing position. Upon a directional operation of the motor 32, the cam 82 is rotated to actuate contact member 86 to a circuit closing position and contact member 88 to a circuit interrupting position.

The cam 84 is illustrated as a part of a motor driven switching unit 85 and is disposed to drive a Geneva gear 90 one-fourth of a revolution for each complete revolution of the cam 84 to drive cam members 92 and 94 one-fourth of a revolution and control the positioning of contact members 96 and 98, respectively, the purpose of such contact members being explained more fully hereinafter.

Associated with each of the control mechanisms is a master controller 100 having contact members 102, 104, 106, 108 and 110 disposed to give three switching positions, identified as 1, 2 and 3, for selectively engaging cooperating fixed contact members depending upon which of the positions the controller is actuated to. Thus with the controller 100 in switching position 1 only contact members 104 and 108 engage the corresponding fixed contact members; in position 2, contact members 102, 106 and 110 engage corresponding fixed contact members; and in position 3, contact members 102 and 110 engage corresponding fixed contact members. Positions 1, 2 and 3 may be termed the "follower," "independent" and "master" positions, respectively, such positions or setting of the controller 100 being determined depending upon whether it is desired to have the regulator unit with which the controller is associated operate as the master unit for all of the units connected in parallel, or as a follower unit or as an independent unit. The controller 100 cooperates with the contact members 96 and 98 of the switching unit 85 to control the operation of the regulating units where one unit is the master unit and the other the follower as will be explained more fully hereinafter.

In order to control the connection of the motor 32 to be initially energized, a contactor 112 having contact members 114 and 116 is disposed to be energized when one of the motor controller relays 72 and 74 is energized and an auxiliary braking relay 118 having contact members 120 and 122 is disposed to be energized when the control system is initially energized. The auxiliary braking relay 118 in this instance is disposed to control the energization of a time delay braking contactor 124 provided with a contact member 126 disposed to connect the terminal 128 of motor 32 to the switching member 44 so that the motor 32 is conditioned to be energized when one of the relays 72 and 74 is energized.

In order to provide for braking the motor 32 upon completion of a regulating operation of the unit 20, a main braking relay 87 having a contact member 89 is utilized and is disposed to cooperate with the relays 72 and 74 as disclosed in the copending application Serial No. 192,503, filed October 27, 1950, in the name of McKeithan for shunting the capacitor 80 and connecting the windings 76 and 78 of the motor 32 in parallel circuit relation as will be explained more fully hereinafter.

An auxiliary controller 130 having contact members 132 and 134 is also disposed to cooperate with the controller 100 and a switch 136 when the controller is in No. 2 or independent position and the switch 136 is in the open position for effecting independent manual adjustment of the associated regulator as will be explained more fully hereinafter.

Where the transformers 20 and 20a are connected in parallel to supply the load 12 and it is desired to regulate their operation with one of the units, for example unit 10, as the master and unit 10a as the follower unit, the switches 42 and 42a and switches 136 and 136a are moved to circuit closing positions and controller 100 of unit 10 is moved to the master position so that the contact members 102 and 110 of position 3 engage their corresponding fixed contact members and controller 100a of unit 10a is moved to the follower position 1 where the contact members 108a and 104a engage their corresponding fixed contact members. For such automatic operation the auxiliary controllers 130 and 130a are in the open circuit position illustrated.

Assume that when such connections are first established the tap changing regulators 20 and 20a are in step and the system is in balance with the primary relay 52 in the neutral position and cams 92 and 92a positioned as illustrated with their contact members 96 and 96a, respectively, in circuit closing position.

If now the load 12 should change so as to demand an operation of the regulating transformer 20 in a direction to increase the voltage, the primary relays 52 and 52a are energized to actuate their movable contact members 58 and 58a, respectively, into engagement with the fixed contact members 60 and 60a, respectively. However, since the controller 100a is in the follower or No. 1 position, the contact member 102a does not bridge its associated fixed contact members and the circuit to the movable contact member 58a remains open. On the other hand, the contact member 102 of the controller 100 establishes a circuit when the primary relay 52 is energized, as described, which extends from the neutral conductor 56 through the contact member 102, conductor 138, movable contact member 58 and fixed contact member 60 of the primary relay 52, energizing winding 140 of the time delay relay 64, conductor 142, switch 136, conductors 144 and 146, contact member 110 of the controller 100 and conductor 148 to the load conductor 36.

When the time delay relay 64 is thus energized, its contact member 150 is actuated to a circuit closing position provided such energization is of sufficient duration to overcome the time delay characteristics of the relay. Thus, if the energization of relay 64 is only momentary, then the contact member 150 remains in its open circuit position.

When the contact member 150 of time delay relay 64 is actuated to its circuit closing position, a circuit is established which extends from the neutral conductor 56a of unit 10a through conductors 152 and 154, contact member 116a of the contactor 112a, conductor 156, contact member 96a of the switching unit 85a, conductor 158, contact member 96 of the switching unit 85, conductor 160, contact member 116 of the contactor 112, conductor 162, contact member 88 of the motor operated cam 82, energizing winding 164 of the secondary relay or contactor 68, conductors 166 and 168, contact member 150 of the time delay relay 64, conductor 142, switch 136, conductors 144 and 146, contact member 110 of the controller 100 and conductor 148 to the load conductor 36.

At the same time that the energizing winding 164 of secondary relay or contact 68 is energized, the winding 164a of the secondary contactor 68a is also energized through a circuit extending from the conductor 162, through contact member 88a controlled by the motor operating cam 82a, energizing winding 164a of the secondary contactor 68a, conductors 166a and 172, contact member 108a of the controller 100a, conductors 174, 166 and 168, contact member 150 of the time delay relay 64, conductor 142, switch 136, conductors 144 and 146, contact member 110 of controller 100, and conductor 148 to the load conductor 36.

At the same time that the windings 164 and 164a of the secondary contactors 68 and 68a are thus energized, a circuit is also established extending from the conductor 162 to energize the auxiliary braking relays 118 and 118a. One of these circuits extends from the conductor 162, through the energizing winding 176 of the auxiliary braking relay 118 and conductors 178 and 180 through the switch 46 to the load conductor 36, the other circuit extending from the conductor 162 through the energizing winding 176a of the relay 118a, conductors 178a and 180a, through the switch 46a to the load conductor 36a. It is thus seen that the auxiliary braking relays 118 and 118a are thus always energized when the regulating units are in step and on position to actuate their contact members 122 and 122a to circuit opening positions to remove the shunting circuits from the capacitors 80 and 80a, respectively, of the motors 32 and 32a, respectively, as will be described more fully hereinafter. At the same time, contact members 120 and 120a of the auxiliary braking relays 118 and 118a, respectively, are actuated to circuit closing positions to connect the energizing windings 182 and 182a of the time delay braking contactors 124 and 124a, respectively, in parallel with the energizing windings of the auxiliary braking relays 118 and 118a whereby the braking contactors 124 and 124a are so energized as to actuate their contact members 126 and 126a to circuit closing position to connect the terminals 128 and 128a of the motors 32 and 32a, respectively through the switches 44 and 44a, respectively, to the load conductors 34 and 34a, respectively, whereby the motors 32 and 32a are conditioned or connected to be energized in response to the regulating systems, as will be described hereinafter.

When the secondary contactors 68 and 68a are thus energized, their contact members 184—186—188, and 184a—186a—188a, respectively, are actuated to circuit closing positions whereby the contact members 186 and 186a establish holding circuits for the energizing windings 164 and 164a, respectively, the holding circuit for the contactor 68 extending from the energizing winding 164, through the contact member 186, conductor 146, contact member 110 of controller 100 and conductor 148 to the load conductor 36, whereas the holding circuit for the secondary contactor 68a extends from energizing winding 164a through conductors 166a, 172, contact member 108a of the controller 100a, conductors 174 and 166, contact member 186 of the contactor 68, conductor 146, contact member 110 of the controller 100 and conductor 148 to the load conductor 36. At the same time the contact members 184 and 184a of the secondary contactors 68 and 68a, respectively, provide a shunt around contact members 116 and 116a, respectively, of the contactors 112 and 112a, respectively, so that when the contactors 112 and 112a are energized as to be described, the energizing circuits for the secondary contactors 68 and 68a are still maintained. Thus the contact member 184 connects the conductor 160 to conductor 189 which is connected to conductor 162. Likewise the contact member 184a by-passes the contact member 116a connecting conductor 154 directly to conductor 156.

When the contact member 188 of secondary contactor 68 is actuated to its circuit closing position, it establishes an energizing circuit for the motor controlling relay 72. This circuit extends from conductor 56, through conductor 190, energizing winding 192 of the motor controlling relay 72, conductor 194, contact member 188 of the secondary relay 68 and conductors 196 and 180 through the switch 46 to the load conductor 36. When the motor controlling relay 72 is thus energized, its contact members 198 and 200 are actuated to their circuit closing position and contact members 201 and 202 are actuated to circuit interrupting positions. Contact member 200 of the relay 72 thus connects the energizing winding 204 of the contactor 112 and the energizing winding 91 of the braking relay 87 in parallel circuit relation with the energizing winding 192 of the relay 72 whereby the contactor 112 is energized to actuate its contact members 114 and 116 to circuit opening positions and the relay 87 is energized to actuate its contact member 89 to a circuit establishing position. However, since the contact member 184 of the secondary relay 68 is in its circuit closing position, the energizing circuit to the winding 176 of the auxiliary braking relay 118 and to the energizing winding 164 of the secondary relay 68 is maintained.

At the same time, the contact member 198 of motor controlling relay 72 establishes a motor energizing circuit for the motor 32 which extends from the load conductor 36, through the switch 46, conductors 180 and 205, contact member 198, conductors 206 and 208 to a terminal of the motor 32 to connect the capacitor in series with the winding 76 and from the terminal 128 of the motor 32 through the contact member 126 of the time delay braking contactor 124 and switch 44 to the load conductor 34. It is to be noted that as the motor 32 is thus energized the main braking relay 87 functions to establish a circuit extending from the switch 46 through conductor 180, contact member 89, adjustable tap 93 and a portion of a resistor 95, contact member 97 of relay 74 and conductor 206 to the motor 32. The circuit thus established is in parallel circuit relation with the motor energizing circuit established by contact member 198 of relay 72 and will therefore not have any immediate effect on the control of the operation of the motor 32. When thus connected, the motor 32 is operated in a direction to drive the switch contact members 30 in a direction to effect an increase in the voltage across the load conductors.

At the same time that the energizing winding 192 of motor control relay 72 is energized, the winding 192a of the motor controlling relay 72a is also energized to actuate its contact members 198a and 200a to circuit closing positions and its contact members 201a and 202a to circuit opening positions. Thus the contact member 200a likewise connects the energizing winding 204a of the contactor 112a and the energizing winding 91a of the main brake relay 87a in parallel circuit relation with the energizing winding 192a of the motor controlling relay 72a. The contact member 198a establishes an energizing circuit for the motor 32a which extends from the load conductor 36a through the switch 46a, conductors 180a and 205a, contact member 198a of the relay 72a, conductors 206a and 208a to a terminal of the motor 32a to connect the capacitor 80a in series circuit relation with the winding 76a thereof and from the terminal 128a through the contact member 126a of the time delay braking contactor 124a and switch 44a to the load conductor 34a. The contact member 89a also establishes an energizing circuit extending from conductor 180a through contact member 89a of the main brake relay 87a, adjustable tap 93a and a portion of resistor 95a, contact member 97a and conductor 206a to the motor 32a, which energizing circuit is in parallel circuit relation with the energizing circuit established by contact member 198a of the relay 72a. The motor 32a is thus energized to drive the switch contact members 30a in a direction to change the setting of the regulating transformer 20a so as to raise the voltage across the load conductors.

As soon as the motors 32 and 32a are thus energized to effect an operation of the regulating transformers, the motors 32 and 32a drive the cams 82—84 and 82a—84a, respectively, whereby the cams 82 and 82a effect an operation of their associated contact members 86 and 86a, respectively, to cooperate with the contact members 200 and 200a of the motor controller relays 72 and 72a, respectively, to establish holding circuits for the relays 72 and 72a. The holding circuit for the energizing winding 192 of the relay 72 extends from the neutral conductor 56, through conductor 190, energizing winding 192, conductor 194, contact members 200 and 86, conductor 180 and the switch 46 to the load conductor 36. Such holding circuit also provides a holding circuit for the energizing winding 204 of the contactor 112 and the energizing winding 91 of the relay 87 which are connected in parallel circuit relation with the energizing winding 192 of the motor controller relay 72. Likewise the holding circuit for the motor controller relay 72a extends from the neutral conductor 56a, through conductor 190a, energizing winding 192a of the relay 72a, conductor 194a, contact member 200a of the relay 72a, contact member 86a controlled by the cam 82a, conductor 180a and switch 46a to the load conductor 36a. Such holding circuit also provides a holding circuit for the energizing winding 204a of the contactor 112a and the energizing winding 91a of the relay 87a so as to maintain the contact member 114a in a circuit interrupting position and contact member 89a in a circuit closing position.

Simultaneously with the movement of the cams 82 and 82a, the cams 84 and 84a of the switching units 85 and 85a, respectively, are operated to drive the associated Geneva gears 90 and 90a, respectively, to actuate the cams 92—94 and 92a—94a, respectively, to effect a switching operation of their associated contact members 96—98 and 96a—98a, respectively. As will be noted, the cams 92, 94, 92a and 94a are similar having cam portions thereof extending over approximately a fourth of the circumference of each of the cam members. The cam surfaces of the members 92 and 94 are displaced 180° and the cams are also displaced about 90° so that when either one of the cam surfaces of the cam 92 is in position to effect a circuit closing operation of its associated contact member 96, the cam portions of the cam member 94 are so positioned that the associated contact member 98 thereof is maintained in a circuit opening position. Thus while the cam 92 effects a circuit closing operation, the cam 94 effects a circuit opening operation and vice versa. The structure and positioning of the cam members 92a and 94a is identical to those of the cams 92 and 94, so that they operate in synchronism insofar as the positioning of the cam members effects a switching operation. Upon completion of a one-step operation of the motor 32 with respect to the regulating transformer 20, the contact member 96 is operated to a circuit interrupting position and the contact member 98 is operated to a circuit closing position. Likewise the contact members 96a and 98a of the switching unit 85a are controlled in response to a step operation of the regulating transformer 20a with which they are associated.

If both of the motors 32 and 32a are operated in synchronism so that the step operation of the regulating transformers 20 and 20a, respectively, are completed simultaneously, then the contact members 98 and 98a of the switching units 85 and 85a, respectively, are in switching positions to establish or maintain the energizing circuit for the windings 164 and 164a of the secondary relays 68 and 68a, respectively, if the primary relay 52 is still energized to demand a further operation of the regulating transformer 20. It will also be understood that upon completion of a one-step operation of the regulating transformers 20 and 20a that the cams 82 and 82a are operated to open the contact members 86 and 86a and to actuate the contact members 88 and 88a, respectively, to circuit closing positions whereby if the contact members 98 and 98a of the switching units 85 and 85a are in their circuit closing positions, then an energizing circuit is established for the secondary relays 68 and 68a, respectively. This energizing circuit extends from the neutral conductor 56a of the unit 10a, through conductors 152 and 154, contact member 116a of the contactor 112a, conductor 156, contact member 98a of the switching unit 85a, conductor 210, contact member 98 of the switching unit 85, conductor 160 and contact member 116 of the contactor 112 to the conductor 162 and from thence through the energizing windings 164 and 164a of the secondary relays 68 and 68a, as described hereinbefore, to again effect an energization of the motor controlling relays 72 and 72a to control or so energize the motors 32 and 32a to effect a continuation in the corrective operation of the regulating transformers 20 and 20a, respectively.

As stated hereinbefore, upon completion of a one-step operation of the units 20 and 20a, cams 82 and 82a, respectively, are operated to actuate contact members 86 and 86a, respectively, to a circuit interrupting position. If the relays 68 and 68a are not energized, as described, the movement of the contact members 86 and 86a, respectively, interrupts the holding circuits for relays 72—87 and 72a—87a, respectively, to actuate contact members 199—200 and 199a—200a, respectively, to a circuit interrupting position and contact members 201—202 and 201a—202a, respectively, to a circuit closing position. However, contact members 89 and 89a of the main brake relays 87 and 87a, respectively, are not immediately actuated to circuit interrupting positions since the relays are provided with a time delay mechanism 99 and 99a, respectively.

Contact member 201 then cooperates with contact member 89 of the brake relay 87 to provide a circuit extending from switch 46 through conductor 180, contact member 89 of relay 87, adjustable tap 93, a portion of resistor 95, contact member 201 and conductors 238 and 240 to a terminal of the winding 76 of the motor 32, whereby the circuit thus established cooperates with the circuit established by the contact member 89 of relay 87 and the contact member 97 of relay 74 to effectively shunt the capacitor 80 and connect the windings 76 and 78 of the motor 32 in parallel to produce braking of the motor 32. Such braking circuits are maintained for a period of time depending upon the setting or adjustment of the time delay mechanism 99 associated with the main brake relay 87.

Likewise, contact member 201a cooperates with contact member 89a of the brake relay 87a to establish a circuit extending from switch 46a through conductor 180a, contact member 89a of relay 87a, adjustable tap 93a and a portion of resistor 95a, contact member 201a of relay 72a and conductors 238a and 240a to a terminal of the winding 76a of the motor 32a. Likewise, the circuit thus established cooperates with the circuit established by contact member 89a of relay 87a and the contact member 97a of relay 74a to effectively shunt the capacitor 80a and connect the windings 76a and 78a of the motor 32a in parallel to effectively brake the motor 32a. Normal braking of the motors 32 and 32a is thus accomplished by the cooperation of the main braking relays 87 and 87a with the relays 72 and 72a, respectively.

If, however, the brake relay 87 or the relay 72 should fail to operate properly, the motor 32 would tend to continue to operate after the completion of the regulated step operation with the result that the transformers 20 and 20a would be operated out of step. Likewise, if during the regulating operation one of the transformers, for example 20, was to be operated at a faster rate of change than the rate of change of the step operation of transformer 20a, the transformers would tend to be operated out of step. Such results are, however, impossible in this system where the switching units 85 and 85a are utilized with the inter connections therebetween and the control of the auxiliary brake relays 118 and 118a which constitute emergency brakes for the motors in case of failure of the main braking system described.

Thus, if motor 32 tends to operate beyond the regulated step operation required or if it operates at a faster rate than motor 32a, the contact member 96 of the switching unit 85 will be operated to its circuit interrupting position before the operation of the contact member 96a of the switching unit 85a and the contact member 98 of the switch unit 85 will be actuated to a circuit closing position while the contact member 98a of the switching unit 85a is still in a circuit interrupting position. This will effectively interrupt the energizing circuits of the windings 164 and 164a of the secondary relays 68 and 68a, respectively, even though the primary relay 52 continues to call for a regulating operation in the raise direction. Thus, until the regulating operation of the regulating transformer 20a is completed the energizing circuits to the windings 164 and 164a of the secondary relays 68 and 68a will be interrupted until completion of the step operation of the regulating transformer 20a and the actuation of the contact member 96a to a circuit interrupting position and of contact member 98a to a circuit closing position is effected. It is thus seen that the switching units 85 and 85a cooperate generally when one of the units is a master unit and the other a follower unit to maintain the regulating operations in step.

It is also to be noted that instead of depending only upon the step operation of the switching units 85 and 85a, a more positive method of maintaining the units in step is provided by the use of the contact members 88 and 88a of cams 82 and 82a, respectively. Thus, the contact members 88 and 88a are actuated to circuit interrupting positions as soon as the regulating operation is initiated, thereby interrupting the energizing circuit for the relay windings 164 and 164a, respectively. As the relays 68 and 68a are thus selectively deenergized, contact members 184—186 and 184a—186a, respectively, are actuated to circuit interrupting positions, and if one of the regulating units operates at a faster rate than the other, the faster unit will be forced to stop upon completion of a step operation until the slower unit completes its corresponding step operation, at which point the switching units 85 and 85a will again be in step to initiate the energizing circuits for the relays 68 and 68a if the primary relay 52 still calls for a regulating operation in the raise direction.

Specifically, as the motor 32 is energized to effect a regulating operation of the transformer 20, the energizing circuit to the winding 164 of the secondary relay 68 is interrupted by movement of the contact member 88 to a circuit opening position. This normally effects deenergization of the secondary relay 68 to actuate its contact members 106 and 104 to circuit interrupting positions, and since the contactor 112 is still energized by reason of the contact member 86 being in circuit closing position, the energizing circuits to the auxiliary braking relays 118 and 118a are interrupted, the contact members 122 and 122a, respectively, are actuated to their circuit closing positions and contact members 120 and 120a, respectively, are actuated to their circuit interrupting positions. Contact members 122 and 122a, however, are not, as yet, effective for establishing the auxiliary or emergency braking circuit, as will be described hereinafter, whereas contacts 120 and 120a interrupt the energizing circuit of the windings 182 and 182a, respectively, of the time delay braking contactors 124 and 124a. However, the contactors 124 and 124a are provided with predetermined time delay characteristics and contact members 126 and 126a are maintained in circuit closing position for a predetermined time after the contactors 124 and 124a are deenergized. Thus, the contact members 126 and 126a maintain the energizing circuits for the motors 32 and 32a until such energizing circuits are interrupted by an operation of the motor controlling relays 72 and 72a, respectively.

As described hereinbefore, upon completion of the one-step operation of the motors 32 and 32a, the cams 82 and 82a, respectively, actuate the contact members 86 and 86a, respectively, to interrupt the holding circuits for the motor controlling relays 72 and 72a, respectively, thus at the same time interrupting the energizing circuits for the windings 204 and 204a, respectively, of the contactors 112 and 112a, respectively, with the result that the contact members 114 and 114a are returned to their circuit closing positions. Thus, if the switching devices 85 and 85a are out of step so as to interrupt the energizing circuit for auxiliary braking relays 118 and 118a, the contact member 114 cooperates with the contact member 122 of the deenergized relay 118 to effectively shunt the capacitor 80 of the motor 32 and connect the windings 76 and 78 thereof in parallel circuit relation to effectively brake the motor 32 even if the main brake relay 87 fails to function properly. Likewise, upon completion of a one-step operation of the motor 32a, if the motors and consequently the devices 85 and 85a are out of step, the contact member 114a cooperates with the contact member 122a to effectively shunt the capacitor 80a of the motor 32a and connect the windings 76a and 78a in parallel circuit relation to effectively brake the motor 32a if the main brake relay 87a fails to function properly.

The braking action obtained by shunting the capacitor and connecting the windings of the motor in parallel can be explained in the following manner by means of the so-called "cross-field" theory of the operation of single-phase motors. When a single-phase motor is running, the rotor current can be regarded as having two components, namely a field component in the axis of the main field and a cross field component substantially in time and space quadrature with the main field component. The motor torque is developed by the reaction of the main field component of the rotor current with the flux set up by the cross field component while a negative or generator torque is developed by reaction of the cross-field current with the main field flux. Now if the motor has two identical windings, as described hereinbefore, 90 electrical degrees apart, as in the reversible capacitor motor described, and these windings are connected in parallel across a single-phase line while the motor is running, the resultant main field of the two windings will be equivalent to that of a single winding halfway between them. This field will result in a cross-field current in the rotor which sets up a cross-field flux in a direction at right angles to the field of the single equivalent winding. This cross-field flux induces a circulating current in the two parallel connected conductor windings. This circulating current flows in a circuit of low impedance which has close magnetic linkage with the cross field and the cross-field flux is damped to almost zero. Since the motor torque is produced by reaction of this flux with the main field component of the rotor current, the motor torque is reduced to a very small value. The cross-field component of the rotor current is substantially increased, since its field is virtually damped out. Since the main field flux with which this current reacts is not substantially affected, negative or braking torque will be considerably increased. The resultant torque with proper value of rotor resistance will be a strong braking action. Since the cross-field current decreases with the speed and becomes zero at standstill, the braking action also decreases to zero and the motor comes to a stop with no tendency to reverse.

If the load 12 should vary so as to require a regulating operation of the transformer to decrease the voltage across the load conductors, then the primary relay 52 is so energized as to actuate its contact member 58 into engagement with the contact member 62 to effectively energize the energizing winding 212 of the time delay relay 66. This energizing circuit extends from the neutral conductor 56, through contact member 102 of the controller 100, conductor 138, contact members 58 and 62 of the primary relay 52, energizing winding 212 of the time delay relay 66, conductor 142, switch 136, conductors 144 and 146, contact member 110 of the controller 100 and conductor 148 to the load conductor 36. If the energization of the primary relay 52 in this manner is of sufficient duration, the time delay relay 66 is operated so as to actuate its contact member 214 to a circuit closing position to establish an energizing circuit for the secondary relays 70 and 70a.

Thus, assuming that the switching units 85 and 85a are in the position illustrated, the time delay relay 66 establishes an energizing circuit which extends from the neutral conductor 56a through conductors 152 and 154, contact member 116a of the contactor 112a, conductor 156, contact member 96a of the switching unit 85a, conductor 158, contact member 96 of the switching unit 85, conductor 160, contact member 116 of the contactor 112, conductor 162, cam-operated contact member 88, energizing winding 216 of the relay 70, conductors 218 and 220, contact member 214 of the time delay relay 66, conductor 142, switch 136, conductors 144 and 146, contact member 110 of the controller 100 and conductor 148 to the load conductor 36. At the same time the energizing circuit is established for the winding 216a of the relay 70a, this circuit extending from the conductor 162 through the contact member 88a, winding 216a, conductors 218a and 222, contact member 104a of the controller 100a, conductors 224, 218 and 226, contact member 214 of the time delay relay 66, conductor 142, switch 136, conductors 144 and 146, contact member 110 of controller 100 and conductor 148 to the load conductor 36.

As will be evident, the energizing windings 176 and 176a of the auxiliary or emergency braking relays 118 and 118a, respectively, will also be energized in the same manner as described with reference to the raise operation previously described herein.

When the secondary relay 70 is thus energized, it operates to actuate its contact members 226, 228 and 230 to circuit closing positions so that its contact member 228 will establish a holding circuit for the relay 70 and the contact member 226 will effectively shunt the contact member 116 of contactor 112. The holding circuit established by contact member 228 may be traced from the conductor 162, through the contact member 88, energizing winding 216 of the relay 70, contact member 228, conductor 146, contact member 110 of controller 100 and conductor 148 to the load conductor 36. Likewise, the circuit for the energizing winding 216a may be traced from the conductor 162, through the contact member 88a, energizing winding 216a, conductors 218a and 222, contact member 104a of controller 100a, conductors 224 and 218, contact member 228 of the relay 70, conductor 146, contact member 110 of the controller 100 and conductor 148 to the load conductor 36.

When the secondary relay or contactor 70 is thus energized, its contact member 230 establishes an energizing circuit for the motor controller relay 74, which extends from the neutral conductor 56, through conductor 190, energizing winding 232 of the relay 74, conductor 234, contact member 230 of the secondary relay 70, conductors 196 and 180, and the switch 46 to the load conductor 36. At the same time, the contact member 202 of the deenergized motor control relay 72 is effective for connecting the energizing winding 204 of the contactor 112 and the energizing winding 91 of the main brake relay 87 in parallel circuit relation with the energizing winding of motor controller relay 74 so as to effect an operation of the contact members 114 and 116 of the contactor 112 to circuit opening positions and the contact member 89 of relay 87 to a circuit closing position. Since the contact member 226 of the secondary relay 70 is in the circuit closing position, the energizing circuit for the auxiliary braking relay 118 and for the secondary relay 70 is maintained even though contactor 112 is energized. When the motor controller relay 74 is thus energized, its contact member 236 establishes a motor energizing circuit which extends from the conductor 36 through the switch 46, conductors 180 and 205, contact member 236, conductors 238 and 240 to a terminal of the motor 32 to effectively connect the capacitor 80 thereof in series with the winding 78 so as to effect an operation of the motor in a direction to drive the switch contact members 30 to effect an operation of the regulating transformer 20 to decrease the voltage across the load conductors.

Since the main brake relay 87 is energized at the same time as the relay 70, a circuit is established extending from the switch 46 through conductor 180, contact member 89 of the brake relay 87, adjustable tap 93, a portion of the resistor 95, contact member 201 of the deenergized relay 72, and conductors 238 and 240 to a terminal of the motor winding 76. This circuit is in parallel with the circuit established by contact member 236 of relay 74 and, therefore, has no immediate effect on the control of the operation of the motor 32.

At the same time the secondary relay 70a is effective for establishing an energizing circuit for the motor control relay 74a, this circuit extending from the neutral conductor 56a through conductor 190a, energizing winding 232a of the relay 74a, conductor 234a, contact member 230a of the secondary relay 70a, conductors 196a and 180a through the switch 46a to the load conductor 36a. At the same time the contact member 202a of the motor control relay 72a is effective for connecting the energizing winding 204a of the contactor 112a and the energizing winding 91a of the brake relay 87a in parallel relation with the energizing winding 232a of the relay 74a. When the motor control relay 74a is thus energized, its contact member 236a establishes a motor energizing circuit for the motor 32a which extends from conductor 36a through the switch 46a, conductor 180a, conductor 205a, contact member 236a, conductors 238a and 240a to a terminal of the motor 32a to connect the capacitor 80a in series with the winding 78a and to so effect the energization of the motor 32a as to effect an operation thereof in a direction to drive the switch contact members 30a in a direction to effectively change the connections of the transformer 20a to decrease the voltage across the load conductors. The circuit established by contact member 89a of brake relay 87a and the contact member 201a of deenergized relay 72a is in parallel with the energizing circuit established by contact member 236a of relay 74a and will therefore have no immediate effect on the control of the motor 32a.

When the motors 32 and 32a are thus energized to effect an operation thereof, the cams 82—84 and 82a—84a, respectively, are driven as described hereinbefore. Movement of the cam 82 again permits movement of the contact member 88 to open circuit position to interrupt the energizing circuit for the secondary relay 70, and also effects the movement of the contact member 86 to a circuit closing position so as to establish a holding circuit for the motor control relay 74. This holding circuit extends from conductor 56 through conductor 190, energizing winding 232 of the relay 74, conductors 234 and 242, contact member 202 of the deenergized motor control relay 72, contact member 86 and conductor 180 through the switch 46 to the load conductor 36. Holding circuits for the energizing windings 91 and 204 of the relay 87 and contactor 112 are also maintained by the contact member 86. The winding 232 of the motor control relay 74 is thus energized while the motor 32 operates through a one-step operation of the regulator and until the cam 82 is rotated to the position shown to actuate the contact member 86 to an open circuit position. Likewise movement of the cam 82a of the unit 10a actuates the contact member 88a to an open circuit position to interrupt the energizing circuit for the winding 216a of the secondary relay 70a and the contact member 86a is actuated to a circuit closing position to establish a holding circuit for the motor control relay 74a, the brake relay 87a and contactor 112a. This holding circuit extends from the neutral conductor 56a through conductor 190a, energizing winding 232a, conductors 234a and 242a, contact member 202a of the deenergized relay 72a, contact member 86a of the cam operated contacts, conductor 180a through the switch 46a to the load conductor 36a.

Upon completion of a step operation of units 20 and 20a, cams 82 and 82a, respectively, are again operated to actuate contact members 86 and 86a, respectively, to a circuit interrupting position. If relays 70 and 70a are not energized, the movement of contact members 86 and 86a, respectively, interrupts the holding circuits for relays 74—87 and 74a—87a, respectively, to actuate contact members 236 and 236a, respectively, to a circuit interrupting position and contact members 97 and 97a, respectively, to a circuit closing position. Because the time delay mechanism 99 and 99a maintains the contact members 89 and 89a, respectively, in circuit closing position for a predetermined period of time after the energizing windings 91 and 91a of brake relays 87 and 87a, respectively, are deenergized, contact member 89 cooperates with contact member 97 of relay 74 to provide an energizing circuit to the terminal of winding 78 of the motor 32. This latter energizing circuit cooperates with the energizing circuit established by contact member 89 and contact member 201 of deenergized relay 72 to effectively shunt the capacitor 80 and connect the windings 76 and 78 of motor 32 in parallel circuit relation to effectively brake the motor. A similar braking of motor 32a is also obtained by a similar operation of the main brake relay 87a.

During the normal operation of units 20 and 20a, the switching units 85 and 85a, respectively are driven in a manner similar to that described hereinbefore to control the positioning of the contact members 96—98 and 96a—98a, respectively, so as to control the energizing circuit to the secondary relays 70 and 70a to maintain them energized when the primary relay 52 is energized only so long as the switching units 85 and 85a are driven in synchronism by the motors 32 and 32a, respectively. As in the previous example when the secondary relay 70 or 70a becomes deenergized, the contact members 226 and 226a, respectively, thereof are actuated to a circuit interrupting position, and since the contactors 112 and 112a, respectively, are energized to their open circuit position, the energizing circuits to the auxiliary or emergency braking relays 118 and 118a, respectively, are interrupted so that the contact members 122 and 122a are returned to their circuit closing positions. However, as long as the motors 32 and 32a are operating in response to the energization of the motor control relays 74 and 74a, respectively, the contactors 112 and 112a, respectively, are energized to maintain their contact members 114 and 114a, respectively, in an open circuit position. Upon completion of a step operation of the regulating transformers 20 and 20a, the cams 82 and 82a are rotated to again actuate the contact members 86 and 86a, respectively, to open circuit positions whereby the energizing windings 204 and 204a of contactors 112 and 112a, respectively, are deenergized and the contact members 114 and 114a, respectively, are actuated to their circuit closing positions. If the regulators and consequently the switching devices 85 and 85a are out of step so that auxiliary braking relays 118 and 118a are deenergized, then the contact members 114 and 114a cooperate with the associated contact members 122 and 122a, respectively, of the auxiliary braking relays 118 and 118a to effectively shunt the capacitors 80 and 80a and connect the windings of motors 32 and 32a, respectively, in parallel to effectively and immediately brake the motors even though the main braking relays 87 and 87a fail to properly function.

If it is desired to have the unit 10a as the master unit instead of unit 10, then the controller 100a is moved to the master or No. 3 position where contact members 110a and 102a engage their corresponding fixed contact members and the controller 100 is moved to the follower or No. 1 position where contact members 104 and 108 engage their cooperating fixed contact members. With such a positioning of the controllers 100 and 100a, it is seen that since the contact member 102 of the controller 100 is in the open circuit position, it is impossible for the time delay relays 64 and 66 to be energized.

Assuming that the switch 136a is in its circuit closing position, if the load 12 should change so as to cause a decrease in the voltage across the load conductors, then the primary relay 52a of unit 10a is energized so as to effect an engagement of the movable contact member 58a with the fixed contact member 60a. Under such circumstances, a circuit is established which extends from the neutral conductor 56a, contact member 102a of the controller 100a, conductor 138a, contact members 58a and 60a of the relay 52a, energizing winding 140a of the time delay relay 64a, conductor 142a, switch 136a, conductors 144a and 146a, contact member 110a of the controller 100a and conductor 148a to the load conductor 36a. This effectively energizes the time delay relay 64a providing the energization of the primary relay 52a is of sufficient duration, whereby the contact member 150a of relay 64a is actuated to a circuit closing position to cooperate with the switching units 85 and 85a to establish an energizing circuit for the secondary relay 68a.

The energizing circuit for the relay 68a thus established extends from the conductor 56 through conductors 152 and 154, contact member 116a of the contactor 112a, conductor 156, contact member 96a of the switching unit 85a, conductor 158, contact member 96 of the switching unit 85, conductor 160, contact member 116 of contactor 112 to the conductor 162 and from thence through contact member 88a of the cam operated contacts, energizing winding 164a of the secondary relay 68a, conductors 166a and 168a, contact member 150a of the time delay relay 64a, switch 136a, conductors 144a and 146a, contact member 110a of the controller 100a and conductor 148a to the load conductor 36a. At the same time the auxiliary braking relays 118 and 118a are energized, as described hereinbefore, with the result that time delay braking contactors 124 and 124a are also energized. Likewise a circuit is completed from the conductor 162 through the cam operated contact member 88, energizing winding 164 of secondary relay 68, conductors 166 and 174, contact member 108 of controller 100, conductors 172, 166a and 168a, contact member 150a of the time delay relay 64a, switch 136a, conductors 144a and 146a, contact member 110a of the controller 100a and conductor 148a to the load conductor 36a whereby the secondary relay 68 is energized simultaneously with the energization of the secondary relay 68a.

When the secondary relay 68a is thus energized, its contact members 184a and 186a are actuated to a circuit closing position whereby contact member 184a shunts the contact member 116a and the contact member 186a establishes a holding circuit for the relay 68a which extends from the energizing winding 164a through the contact member 186a, conductor 146a, contact member 110a of controller 100a and conductor 148a to the load conductor 36a. Since the energization of the secondary relay 68 in this operation is dependent upon the energization of the secondary relay 68a, both of the secondary relays are maintained energized so long as the holding circuit for the relay 68a is maintained.

With the relays 68 and 68a energized, as described, the operation of the motor controlling relays 72 and 72a, respectively, and the resultant operation of the motors 32 and 32a are as described hereinbefore when the unit 10 was the master unit. It is quite evident that as soon as the switching units 85 and 85a are operated to be out of step either by reason of failure of the main brake relays 87 and 87a, respectively, or because one unit is driven faster than the other, that it is impossible to energize the secondary relay 68a with the result that a further step operation of the motors 32 and 32a will be impossible until the switching units 85 and 85a are brought into step relation, thereby insuring simultaneous operation of the regulating transformers 20 and 20a to maintain them in step.

If the change in the load condition should be such as to effect an increase in the voltage across the load conductors, then the primary relay 52a is energized to actuate its movable contact member 58a into engagement with the fixed contact member 62a to establish an energizing circuit for the time delay relay 66a. This circuit extends from the neutral conductor 56a through contact member 102a of controller 100a, conductor 138a, movable contact member 58a of the relay 52a, fixed contact member 62a, energizing winding 212a of the time delay relay 66a, conductor 142a, switch 136a, conductors 144a and 146a, contact member 110a of the controller 100a and conductor 148a to the load conductor 36a. Thus if the energization of primary relay 52a is of sufficient duration to overcome the time delay characteristics of the relay 66a, the relay 66a is energized to actuate its contact member 214a to a circuit closing position to effect the energization of the secondary relays 70a and 70.

With the contact member 214a in circuit closing position, a circuit is established which extends from neutral conductor 56 through conductors 152 and 154, contact member 116a of the contactor 112a, conductor 156, contact member 96a of the switching unit 85a, conductor 158, contact member 96 of the switching unit 85, conductor 160, contact member 116 of the contactor 112, conductor 162, contact member 88a, energizing winding 216a of the secondary relay 70a, conductors 218a and 220a, contact member 214a, switch 136a, conductors 144a and 146a, contact member 110a of controller 100a and conductor 148a to the load conductor 36a.

At the same time an energizing circuit is established for the secondary relay 70 which extends from the conductor 162 through the contact member 88 of the cam operated contacts, energizing winding 216 of the relay 70, conductors 218 and 224, contact member 104 of the controller 100, conductors 222, 218a and 220a, contact member 214a of the time delay relay 66a, conductor 142a, switch 136a, conductors 144a and 146a, contact member 110a of the controller 100a and conductor 148a to the load conductor 36a. Simultaneously with the energization of the secondary relays 70 and 70a the auxiliary braking relays 118 and 118a are also energized as described hereinbefore.

When the relay 70a is thus energized, its contact member 226a effectively shunts the contact member 116a and contact member 228a is actuated to establish a holding circuit for the relay 70a. This holding circuit extends from the energizing winding 216a through the contact member 228a of relay 70a, conductor 146a, contact member 110a of the controller 100a and conductor 148a to the load conductor 36a. At the same time the contact member 230a of the motor control relay 70a is actuated to a circuit closing position to effect an operation of the motor control relay 74a to establish the energizing circuits described hereinbefore for the motor 32a to effect an operation thereof to drive the switch contact members 30a in a direction to cause the regulating transformer to increase the voltage across the load conductors. Simultaneously, the secondary relay 70 of unit 10 is effective so that the contact member 230 thereof establishes the energizing circuit for the motor control relay 74, whereby the relay 74 is effective for establishing the energizing circuit for the motor 32 to effect an operation thereof to drive the switch contact members 30 in a direction to change the setting of the transformer 20 and effect an increase in the voltage across the load conductors.

As in the previous cases, if the switching units 85 and 85a are not driven in synchronism or if the main braking relays 87 and 87a fail, the energizing circuits for the secondary relays of the units 10 and 10a are interrupted whereby neither of the units can be operated until both units have completed a step operation. Likewise when the step operation has been completed and the cams 82 and 82a are effective for actuating their contact members 86 and 86a to a circuit interrupting position, the contactors 112 and 112a, respectively, are deenergized whereby their contact members 114 and 114a, respectively, cooperate with the contact members 122 and 122a, respectively of the auxiliary braking relays when the switching devices 85 and 85a are out of step for effectively shunting the capacitors 80 and 80a and connecting the windings of the motors 32 and 32a in parallel circuit relation to effectively brake the motors.

If for some reason it is desired to have the units 10 and 10a operate as independent units, then the master controllers 100 and 100a are moved to their independent or No. 2 positions where the contact members 102—106—110 and 102a—106a—110a, respectively, engage their cooperating fixed contact members. Under such circumstances, the contact members 102 and 102a engage their cooperating fixed contact members whereby the movable contact members 58 and 58a of the primary relays 52 and 52a, respectively, are connected through the contact members 102 and 102a, respectively, to their respective neutral conductors 56 and 56a, so that when either, or both, of the primary relays 52 or 52a are energized, they will be effective for establishing energizing circuits for their associated time delay relays 64—66 and 64a—66a, respectively, depending upon the direction of movement of the associated movable contact members.

At the same time, it is to be noted that contact members 106 and 106a of the controllers 100 and 100a, respectively, cooperate to shunt the switching units 85 and 85a from the energizing circuits for the secondary relays 68—70 and 68a—70a. This is evident from the circuit established which extends from the neutral conductor 56a of unit 10a through conductors 152 and 244a, contact member 106a of controller 100a, conductor 246, contact member 106 of controller 100 and conductor 189 to the conductor 162. Thus when the controllers 100 and 100a are in their independent or No. 2 positions to establish the circuit to the conductor 162, if the primary relay 52 is energized so as to effect the engagement of contacts 58 and 60 to establish the energizing circuit for the time delay relay circuit 64, then the energizing winding 164 of the secondary relay 68 is energized by a circuit which extends from the conductor 162 through the cam operated contact member 88, energizing winding 164, conductors 166 and 168, contact member 150 of the time delay relay 64, conductor 142, switch 136, conductors 144 and 146 through the contact member 110 of controller 100 and the conductor 148 to the load conductor 36. Similarly, if the primary relay 52 is energized to operate its movable contact member 58 to engage the fixed contact member 62 so as to effect an energization of the winding 212 to operate the contact member 214 of the time delay relay 66 to a circuit closing position, an energizing circuit is established for the secondary relay 70 which extends from the conductor 162 through the cam operated contact member 88, energizing windings 216, conductors 218 and 220, contact member 214 of the time delay relay 66, conductor 142, switch 136, conductors 144 and 146, contact member 110 of the controller 100 and the conductor 148 to the load conductor 36. It is thus seen that the control of the motor control relays 72 and 74 can be effected by controlling the energization of the secondary relays 68 and 70 in the same manner as described with reference to the master-follower connections described hereinbefore.

Similar connections are established for independent operation of the unit 10a but for purpose of simplification will not be described, it being understood that once the controllers 100 and 100a are in the independent or No. 2 position described so as to shunt the switching units 85 and 85a, that the operation of the units 10 and 10a will be identical to that described with reference to the unit 10.

If during the operation of the units it becomes desirable to operate either of the units manually for example unit 10, so as to bring the regulating transformers 20 and 20a into step, then such manual operation of the regulating transformer 20 may be effected by placing the controllers 100 and 100a in the independent or No. 2 position described hereinbefore and actuating the switch 136 to the open circuit position illustrated so as to remove the automatic control from the regulating system and the auxiliary control switch 130 may be operated so as to selectively move its contact members 132 or 134 into engagement with the cooperating fixed contact members depending upon whether it is desired to effect a raising or a lowering of the voltage on the load conductors. Thus, for example, if the auxiliary control switch 130 is actuated to a position where its contact member 132 is in engagement with its fixed cooperating contact members, an energizing circuit for the secondary relay 68 is established which extends from the conductor 56a through conductors 152 and 244a, contact member 106a of the controller 100a, conductor 246, contact member 106 of controller 100, conductors 189 and 162, cam operated contact member 88, energizing winding 164 of the relay 68, conductors 166 and 168, contact member 132 of the auxiliary control switch 130, conductors 144 and 146, contact member 110 of the controller 100 and conductor 148 to the load conductor 36. Similarly, an energizing circuit for the secondary relay 70 may be established by actuating the auxiliary control switch 130 to a position where its contact member 134 engages the cooperating fixed contact members to establish a similar circuit which extends from the conductor 162 through the cam operated contact member 88, energizing winding 216 of the relay 70, conductors 218 and 220, contact member 134 of the auxiliary control switch, conductors 144 and 146, contact member 110 of the controller 100 and conductor 148 to load conductor 36. The operation of the motor controlling relays 72 and 74 in response to an energization of the secondary relays 68 and 70 is identical to that described hereinbefore with reference to the automatic operation of the systems.

In all cases of automatic operation where one of the units is a master and the other as follower, it is apparent that the auxiliary or emergency braking relays 118 and 118a are simultaneously energized and that if the units and consequently the switching devices 85 and 85a are out of step, the contactors 112 and 112a, respectively cooperate with the emergency braking relays 118 and 118a, respectively, to effect substantially instantaneous braking of the associated motors 32 and 32a without any overrun of the motors even though the main braking relays 87 and 87a fail to function properly. The positive braking of each of the motors by the auxiliary braking relays 118 and 118a upon completion of a step operation thus effectively cooperates with the switching units 85 and 85a to aid in maintaining the regulating transformers 20 and 20a, respectively, in step so that there will be no unbalance of the load on the transformers. The time delay provided for the contactors 124 and 124a is sufficient to insure that their contact members 126 and 126a are maintained in circuit closing position a sufficient period of time after the contactors 124 and 124a, respectively, are deenergized so as to maintain the associated motors 32 and 32a, respectively, connected so that effective braking power can be applied to the motors upon completion of a one-step operation of the regulating transformers.

In conclusion, it is pointed out that while the illustrated examples constitute practical embodiments of my invention, I do not limit myself to the exact details shown, since the modifications of the same may be considerably varied without departing from the spirit of the invention as defined in the appended claims.

I claim as my invention:

1. In a motor control system for a master motor and a slave motor, in combination, a plurality of motors, each of the motors being of the split-phase capacitor type having two substantially identical single-phase windings and a phase-shifting capacitor disposed to be selectively connected in series with one or the other of the windings to control the directional rotation of the associated motor, a pair of contactors for each of the motors disposed to be selectively energized to control the series connection of the capacitor with the windings of the respective motor, a control means for each pair of contactors for initiating the control of the operation of its respective motor in one direction or the other, interconnected switching means for rendering one of the motors a master and one of the motors a follower and for rendering only the control means of the master motor operative to control the selective energization of each of the pairs of contactors associated with the master motor and the slave motor, respectively, the switching means including a step switch for each of the motors disposed for operation to establish the interconnections only upon completion of a step operation of the motors where the motors are in step, contact means associated with each of the motors disposed to be simultaneously energized when the interconnections are established by the switching means to connect each of the motors to be directionally energized in accordance with the selective energization of the pair of contactors associated therewith, and another contact means associated with each of the motors disposed to function when the associated pair of contactors and said contact means are deenergized to cooperate with said contact means to shunt the phase-shifting capacitor and connect the single-phase windings of the associated motor in parallel circuit relation to effectively brake the motor.

2. In a motor control system for a master motor and a slave motor, in combination, a plurality of motors, each of the motors being of the split-phase capacitor type having two substantially identical single-phase windings and a phase-shifting capacitor disposed to be selectively connected in series with one or the other of the windings to control the directional rotation of the associated motor, a pair of contactors for each of the motors disposed to be selectively energized to control the series connection of the capacitor with the windings of the respective motor, a control means for each pair of contactors for initiating the control of the operation of its respective motor in one direction or the other, interconnected switching means for rendering one of the motors a master and one of the motors a follower and for rendering only the control means of the master motor operative to control the selective energization of each of the pairs of contactors associated with the master motor and the slave motor, respectively, the switching means including a step switch for each of the motors disposed for operation to establish the interconnections only upon completion of a step operation of the motors where the motors are in step, contact means associated with each of the motors disposed to be simultaneously energized when the interconnections are established by the switching means to connect each of the motors to be directionally energized in accordance with the selective energization of the pair of contactors associated therewith, another contactor associated with each of the motors disposed to function when the associated pair of contactors and said contact means are deenergized to cooperate with said contact means to shunt the phase-shifting capacitor and connect the single-phase windings of the associated motor in parallel circuit relation to effectively brake the motor, and time delay means associated with each of said contact means to maintain the connection of the associated motor for a period of time after said contact means is deenergized to insure the effective braking of the motor.

3. In a motor control system for a master motor and a slave motor, in combination, a plurality of motors, each of the motors being of the split-phase capacitor type having two substantially identical single-phase windings and a phase-shifting capacitor disposed to be selectively connected in series with one or the other of the windings to control the directional rotation of the associated motor, a pair of contactors for each of the motors disposed to be selectively energized to control the series connection of the capacitor with the windings of the respective motor, a control means for each pair of contactors for initiating the control of the operation of its respective motor in one direction or the other and disposed for operation to selectively energize the contactors, switching means associated with each of the control means disposed to be actuated by the motor associated therewith, a switching device associated with each of the control means disposed for selective manual operation to establish interconnections between the control means and motor operated switching means associated with the motors to establish one of the motors as a master and one of the motors as a follower, the manually operated switching devices and the motor operated switching means thereby cooperating to effect a simultaneous selective energization of the contactors when the control means of the master motor is energized to selectively control the connections of the master and slave motors to complete a step operation of the master and slave motors, the motor operated switching means being disposed to interrupt the energization of the control means when the master and slave motors are out of step, contact means associated with the master and slave motors disposed to be simultaneously energized, when one of the motors is the master and one of the motors is a follower and said interconnections are established, to connect the master and slave motors to be selectively energized in accordance with the selective energization of the pair of contactars associated therewith, and another contactor associated with each of the master and slave motors disposed to function when the associated pair of contactors are deenergized to cooperate with said contact means to shunt the phase-shifting capacitor and connect the single phase windings of the associated motor in parallel circuit relation to effectively brake the motor.

4. In a motor control system for a master motor and a slave motor, in combination, a plurality of motors, each of the motors being of the split-phase capacitor type having two substantially identical single-phase windings and a phase-shifting capacitor disposed to be selectively connected in series with one or the other of the windings to control the directional rotation of the associated motor, a pair of contactors for each of the motors disposed to be selectively energized to control the series connection of the capacitor with the windings of the motor, another pair of contactors associated with each motor disposed to be selectively energized to control the selective energization of said motor control contactors, a control means for each another pair of contactors for controlling the initial selective energizaton of said another pair of contactors under predetermined operating conditions, a switching means associated with each of said another pair of contactors disposed to be actuated by the motor associated therewith, a manually operated switching device also associated wtih each of the motor operated switching means disposed for selective operation to cooperate with the motor operated switching means and said another pair of contactors associated with the motors to establish interconnections therebetween to establish one of the motors as a master and one of the motors as a follower, the manually operated switching device of the follower motor rendering the control means of the follower motor ineffective and connecting said another pair of contactors to be selectively energized by the control means of the master motor when the motor operated switching means are in step with one another, contact means associated with each of the motors disposed to be simultaneously energized with the initial energization of said another pair of contactors to connect each of the motors to be directionally energized in accordance with the selective energization of the pair of contactors associated therewith, and another contactor associated with each of the motors disposed to function when the associated pair of contactors and said contact means are deenergized to cooperate with said contact means to shunt the phase-shifting capacitor and connect the single-phase windings of the associated motor in parallel circuit relation to effectively brake the motor.

5. In a motor control system for a master motor and a slave motor, in combination, a plurality of motors, each of the motors being of the split-phase capacitor type having two substantially identical single-phase windings and a phase-shifting capacitor disposed to be selectively connected in series with one or the other of the windings to control the directional rotation of the associated motor, a pair of contactors for each of the motors disposed to be selectively energized to control the series connection of the capacitor with the windings of the motor, another pair of contactors associated with each motor disposed to be selectively energized to control the selective energization of said motor control contactors, a control means for each said another pair of contactors for controlling the initial selective energization of said another pair of contactors under predetermined operating conditions, a switching means associated with each of said another pair of contactors disposed to be actuated by the motor associated therewith, a manually operated switching device also associated with each of the motor operated switching means disposed for selective operation to cooperate with the motor operated switching means and said another pair of contactors associated with the motors to establish interconnections therebetween to establish one of the motors as a master and one of the motors as a follower, the manually operated switching device of the follower motor rendering the control means of the follower motor ineffective and connecting said another pair of contactors to be selectively energized by the control means of the master motor when the motor operated switching means are in step with one another, contact means associated with each of the motors disposed to be simultaneously energized with the initial energization of said another pair of contactors to connect each of the motors to be directionally energized in accordance with the selective energization of the pair of contactors associated therewith, another contactor associated with each of the motors disposed to function when the associated pair of contactors and said contact means are deenergized to cooperate with said contact means to shunt the phase-shifting capacitor and connect the single-phase windings of the associated motor in parallel circuit relation to effectively brake the motor, and time delay means associated with each of said contact means to maintain the connection of the associated motor for a predetermined period of time after said contact means is deenergized to insure the effective braking of the associated motor.

WILLIAM E. WRENN.

References Cited in the file of this patent

UNITED STATES PATENTS

| Number | Name | Date |
|---|---|---|
| 1,970,389 | Minneci | Aug. 14, 1934 |
| 2,512,989 | Aicher | June 27, 1950 |